Jan. 31, 1950  H. B. CORSAW  2,495,957
FILM SPLICER AND VIEWER
Filed Dec. 16, 1947  3 Sheets-Sheet 1

Inventor
Harry B. Corsaw

By *Clarence A. O'Brien
and Harvey B. Jacobson*
Attorneys

Jan. 31, 1950  H. B. CORSAW  2,495,957
FILM SPLICER AND VIEWER
Filed Dec. 16, 1947  3 Sheets-Sheet 2
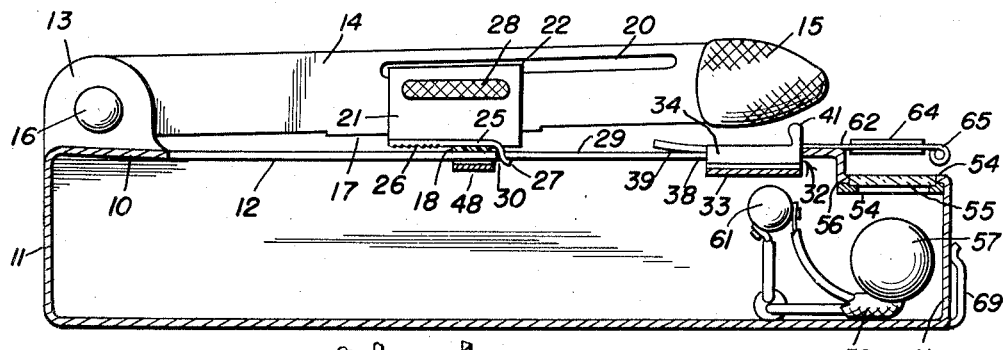
Fig. 3.
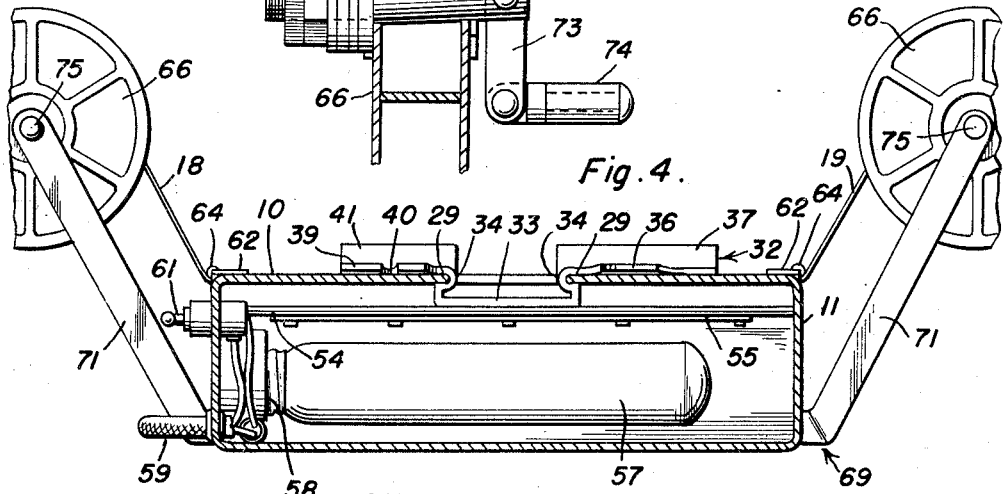
Fig. 10.
Fig. 4.
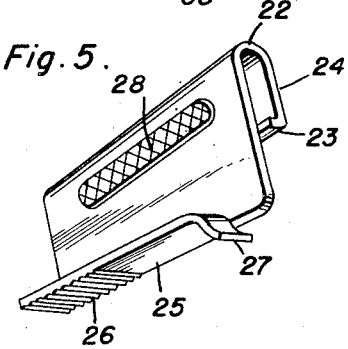
Fig. 5.
Inventor
Harry B. Corsaw
By Clarence A. O'Brien
and Harvey B. Jacobson
Attorneys Jan. 31, 1950   H. B. CORSAW   2,495,957
FILM SPLICER AND VIEWER
Filed Dec. 16, 1947   3 Sheets-Sheet 3

Harry B. Corsaw
INVENTOR.

BY *Thomas A. O'Brien*
*and Harvey B. Jacobson*
Attorneys

Patented Jan. 31, 1950

2,495,957

UNITED STATES PATENT OFFICE 2,495,957

FILM SPLICER AND VIEWER

Harry B. Corsaw, Visalia, Calif.

Application December 16, 1947, Serial No. 792,039

4 Claims. (Cl. 154—42.1)

My invention relates to apparatus for splicing, trimming and scraping film, preparatory to cementing ends thereof and for the purpose of viewing said film to ascertain where and what amount of film should be cut out before splicing. The apparatus in the industry is conventionally referred to as a splicer and a viewer or a combination splicer and viewer.

The invention has for its general object to provide a greatly simplified device of this character, the operation of which is fool-proof, and through the use of which it is not necessary to handle the film a single time during the period occupied by the cutting, scraping and splicing operation.

Still another object is the provision of a splicer and viewer which will perform all of the necessary operations in joining two ends of film and/or determining the bad or poorly developed part of the film with only a minimum expenditure of time.

Another object is to produce a splicer and viewer which can be manufactured and sold at a relatively low price but which will function to perform the various operations required at least as satisfactorily as much more expensive equipment of this character.

Other objects and advantages reside in the details of construction and operation as more fully hereinafter described and claimed, reference being had to the accompanying drawings forming part hereof, wherein like numerals refer to like parts throughout, and in which:

Figure 3 is a longitudinal sectional view taken on the line 3—3 of Figure 1;

Figure 4 is a transverse sectional view taken on the line 4—4 of Figure 1 looking toward the front and showing the film supporting reels;

Figure 5 is a perspective view of a scraper and holder or clamp for the film detached from the knife or cutting blade;

Figure 1:
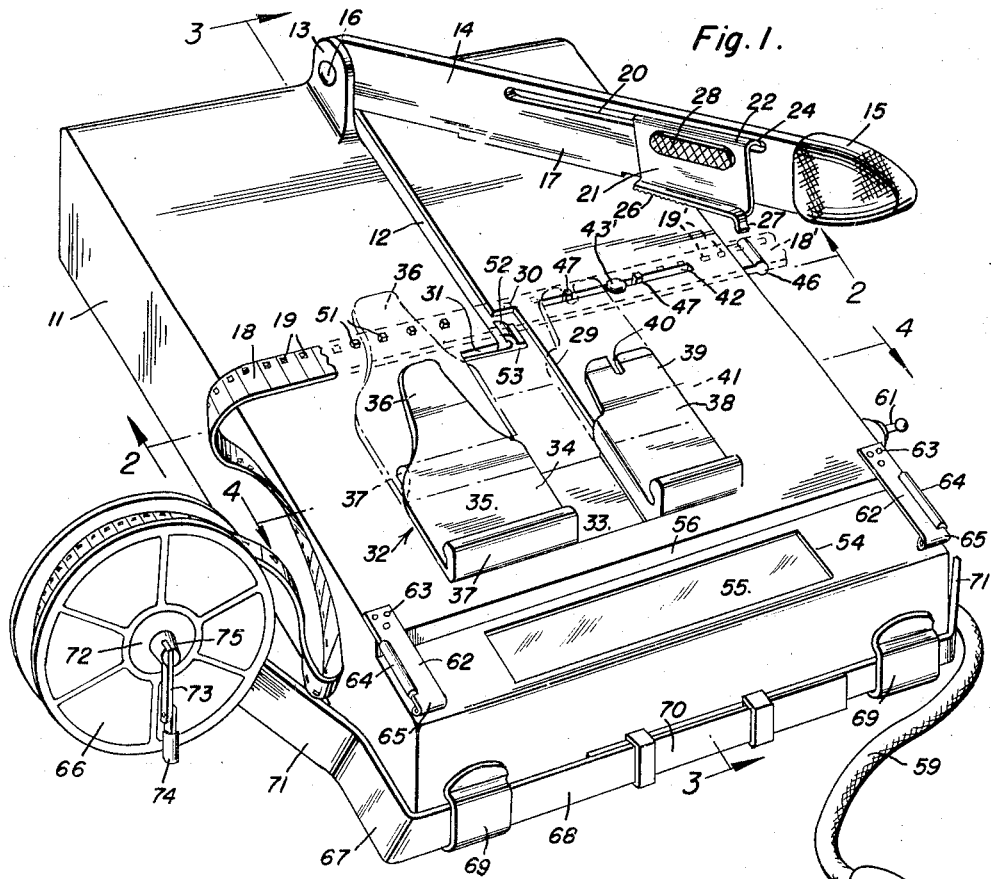
Figure 1 is a perspective view of a splicer and viewer made in accordance with the invention, the parts being in the position which they assume at the start of a splicing and viewing operation.
Figure 2:
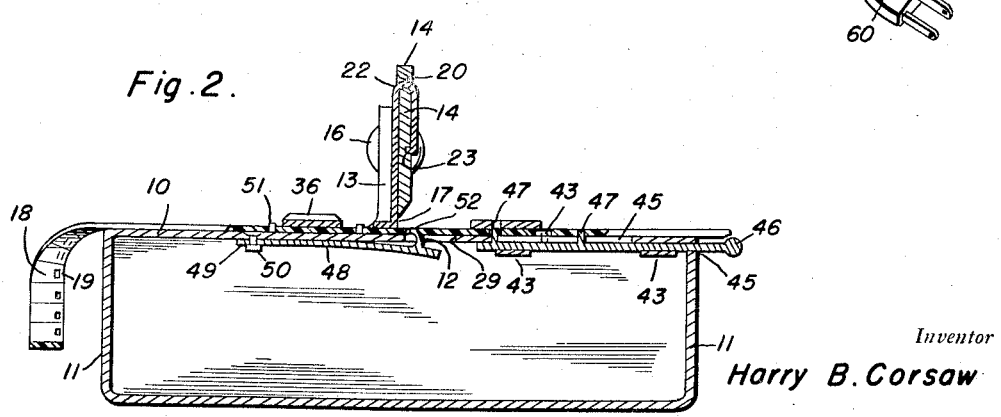
Figure 2 is a transverse sectional view taken on the line 2—2 of Figure 1 with the knife down in cutting and clamping or holding position.

Referring to the drawings in detail, and to the form of the invention shown in Figures 1 to 5 inclusive, the splicer and viewer is shown as comprising a base 10 having a downward flange or sides 11 surrounding the same, forming a flat box, the upper surface of which is provided near one end with a substantially central longitudinal slot 12 opening through the top, and provided at the rear end thereof at one side, with an apertured upright lug 13 in the form of a vertical flange or projection on the top of the base to which is pivoted a knife or blade 14 having a hand grip portion 15 at the end thereof. The knife 14 is pivoted at 16 on the lug 13 on a horizontal axis to swing vertically in an arc in line with the slot or opening 12 and to move into and out of the same, being held in line by the lug 13. The lower edge of the knife or blade 14 is provided with a cutting edge 17 which travels snugly along the left hand edge of the slot 12 so as to shear or cut off a film indicated at 18 and which may be an eight millimeter film having openings 19 along one edge, or a sixteen millimeter film having marginal perforations or openings along both edges as well known in the art. The blade 14 is provided with a longitudinal slot 20 near its top edge, to take a movable scraper and clamp or holder 21 shown more particularly in Figure 5 having its top edge rebent as indicated at 22 to slidably engage the slot 20 and having an inturned portion 23 at the lower end of the downturned side 24, to engage the opposite side of the blade and guide the scraper and clamp 21 in its movement along the slot. The lower edge of the member 21 is provided with an outturned horizontal flange 25 which is corrugated or roughened at its bottom surface adjacent the rear end thereof as indicated at 26, in order to scrape emulsion from the surface of the film and the rear end is provided with a struck out downturned lug 27. Also, one side may be provided with a roughened gripping portion 28 to facilitate sliding the scraper and clamp back and forth in the slot 20.

At the front end of the slot 12, the base or top of the box is provided with a wider opening 29 having the right hand side extending rearwardly further than the left hand side as indicated at 30, the left hand side being indicated at 31 and running transversely on opposite sides of the slot 12. In the opening 29 is disposed a film holder 32 of the construction shown more particularly in Figure 4 of the drawings having a central depressed portion 33 rebent at the sides as indicated at 34 to provide grooves outwardly to engage the opposite edges of the opening 29 for sliding movement with the portion 33 disposed below the top of the base or box and parallel thereto. The part 33 thus serves as a connecting portion transversely between a film holder part 35 at the left hand side having a resilient upwardly flexed or pressed tapered end 36 extending toward the back at one side of the slot 12 and opening 29 and having an upturned lug 37 at its forward end by which it may be manipulated or slid back and forth in the opening 29. At the right hand side, an integral portion 38 is provided also having a reduced forward resilient extension 39 and a notch 40 in its free edge opening rearwardly together with an operating lug 41 extending upwardly at its forward edge. Disposed transversely across the base or box 10 at the right hand side is a slot 42 which may be provided with guides 43 therebeneath with or without a central headed pin 43' slidably retaining a film holder 44 therein for transverse sliding movement and extending through an opening 45 (Figure 2) in the side of the box or base where it is provided with a gripping portion 46 at its outer end. The holder 44 has upward projections 47 extending through the slot 42 to engage the marginal perforations 19' of another film section 18' to be spliced or joined to the section 18. In line with the holder 44 and slot 42 at the left hand side of the extension 30 of the opening 29 and slot 12 at the point of communication of the latter with the former at its forward end, is a normally raised spring 48 having a bifurcated end 49 fastened around a headed pin or screw 50 and held by a nut or otherwise. The top of box or base 10 is provided with projections 51 extending up through openings in the top of the box or base 10 to engage the perforations 19 of the film section 18. The spring 48 extends into the rearward extension of the opening 29 and has an outwardly bent top projection 52, so bent as to receive the end of film section 18 thereunder and allow film section 18' to slide over the top of it without hanging up or catching on the projection 52 or the end of film 18 when the film holder 44 is slid to the left to make the proper lap of the two films. Spring 48 has an inward extension or end 53 beyond bent portion 52 beneath opening 29 and has only one function and that is to raise film 18' back up out of slot 12 after the knife or blade 14 has pressed it down into the slot while cutting off the ends of the film. If it were not for the spring the end of film 18' would stay down in slot 12 where it has been forced by blade 14, then when holder 44 was moved to the left to push the film 18' over the end of film 18 to make the proper lap, film 18' would hang up on the left hand side of opening 12 or on the end of film 18.

At the front, the base or box 10 is provided with a view opening 54 in which is mounted a translucent panel or the like 55 in a depressed portion 56 transversely across the top of the base or box 10 and beneath which is mounted a lamp 57 in a suitable socket 58 insulated from the base or box and having an extension cord 59 enclosing conductors connected to a plug 60 adapted to be inserted in a wall socket for supplying current to the lamp. The operation of the lamp may be controlled by a switch 61 interposed in the circuit with the lamp and the source of supply for current, which is shown mounted upon and insulated from one side of the base or box, or a battery operated flashlight may be used instead of the foregoing lamp. By reason of the depression 56 and guide members 62 mounted at the sides of the base or top of the box at the front as indicated at 63 to extend over and down in front of the depression 56, the film is adapted to be run transversely across the base or box at the front over the lighted view opening and panel so that the film may be carefully observed to determine which portions of the film are bad and have to be cut out or discarded. The guide members 62 are shown provided with rolled edges 64 to prevent injury to the film and depending at its end 65 to prevent displacement of the film forwardly. The film is adapted to be held upon spools or reels 66 mounted upon the ends of an angular holder 67 adapted to be held at its transverse intermediate portion 68 beneath clamps or clasps 69 provided at the front of the base or box 10. The intermediate portion 68 is provided with an overlap 70 designated to permit extension of the length of the holder 67 having rearwardly offset arms 71 bent at right angles at the ends thereof and perforated at their upper free ends extending outwardly in inclined position, to support the reels 66 for winding or unwinding the film in opposite directions. The holes in the ends of the arms 71, receive headed tapered shafts 72 to which links 73 are pivoted and to the free ends of which handles 74 are pivoted, thus permitting the same to be extended in rectilinear positions to permit mounting and demounting of the reels, or to permit the links 73 to be turned at right angles to the shafts in which the same are pivoted at the slotted ends of the shafts as indicated at 75 and the handle portions 74 of the cranks turned outwardly at right angles to the links 73 parallel to the shafts, to form cranks whereby the reels may be turned while tightly held frictionally on the tapered portions 73 of the shafts at the hubs of the reels.

In the operation of the device as described, the film holder 32 is slid toward the operator in a guide way at the opening 29 and the blade is raised to a perpendicular position. The film section 18 is then engaged over the projections 51 on the base or box for engagement with perforations 19 of the film, allowing the ragged end of the film to project over the cutting edge of the slot 12 which serves as a shear in connection with the cutting edge 17 of the blade 14. The film holder 32 is then pushed rearwardly as indicated in dotted lines in Figure 1 so that the longer portion 36 will overlie the film section 18 between the projections 51 to hold this film section in place. Next, the film section 18' is placed in position so that the perforations 19' thereof will engage the projections 47, being sure that the holder 44 is pulled out to the extreme right in the slot 42 before placing the film section 18' in position so as to allow the ragged end of the film section 18' to extend across the forward extension or reduced portion of the opening 29 and slot 12 and cutting edge of the latter. In this position, the film section 18' will overlap the film section 18 previously placed in position. Then the film holder 32 is pushed rearwardly further until the portion 39 extends over the slot 42 so that the notch or recess 40 will engage the inner projection 47 of the holder 44 by straddling the same over the film section 18' to hold the latter in position. The handle of the blade 14 is then grasped and brought down into the slot 12 forcing its cutting edge along the cutting edge of the slot to cut both films off in one stroke and the end of film 18' being forced down past the end of film section 18 and against spring projection 52, when knife or blade 14 is raised, spring projection 52 forces film 18' up just far enough to clear the end of film section 18 when holder 44 is slid to the left to make the proper lap of the two film sections.

Next, the scraper and holder or clamp 21 is pressed down by gripping the same between the thumb and finger and slid back and forth so that the scraper surface 26 overlying the end of film section 18 at the slot 12 and to the left of the latter, may be used to scrape off the emulsion on the upper or emulsion side of the film section 18. The blade is then raised and cement applied to the scraped end of the film section 18 at the inner end thereof and the holder 32 pulled forwardly or slid toward the operator until the notch or recess 40 clears the projection 47 with which it was engaged. The film section 18' is then moved to the left by sliding the holder 44, while the film section 18 is held by the holder 32 and projections 51 across the slot 12 at the rearward extension 30 of the opening 29, the inward movement of the holder 44 causing the proper length of overlap of the film section 18' over the film section 18. The scraper or clamp and holder 21 is then pushed rearwardly in the slot 29 until the front smooth portion of the flange 25 in front of the portion 26 is disposed over the film and pressed down firmly, holding the cemented ends of the film sections in a snug position together for a few seconds until dried and securely fastened together. Then a gentle downward touch on the blade 14 will release the tension of the member 27 against the top at the slot 12 so that the blade will be raised to a position out of engagement with the film sections as spliced or joined and the blade is then raised to a perpendicular position with the film properly cut, scraped, overlapped and spliced.

In the operation of the viewer, the operator finds in showing a picture that there are bad spots of maybe a few inches or even feet that need to be cut out of the film. The film is mounted upon the reel 66 of the holder 67 as previously described by properly adjusting the length of the holder and mounting the same in the clamps or clasps 69 at the front of the base or box. The slack between the reels is then dropped between the same, so as to pass under the guides 62 and the depression 56 and over the view glass or translucent panel 55 over the illuminating means or lamp 57 which is switched on. By turning one crank or the other of the reels, in whichever direction he desires to observe the picture through the view glass, he may with good eyes readily observe the pictures or by using a magnifying glass, view the film in a suitable manner to ascertain which parts must be cut out of the film. The remaining portion of the film is then pulled over the view glass slowly observing the picture until the end of the said spot is reached. The bad spots are torn off with the fingers or cut with a blade, discarding the bad or cut out portions after which, the film is removed from the viewer and the ragged end of the film section placed in position to be cut, scraped and spliced in the manner set forth. The holder 67 by reason of being extensible and collapsible, may be collapsed to the smallest size and put away until needed again.

Figure 6:
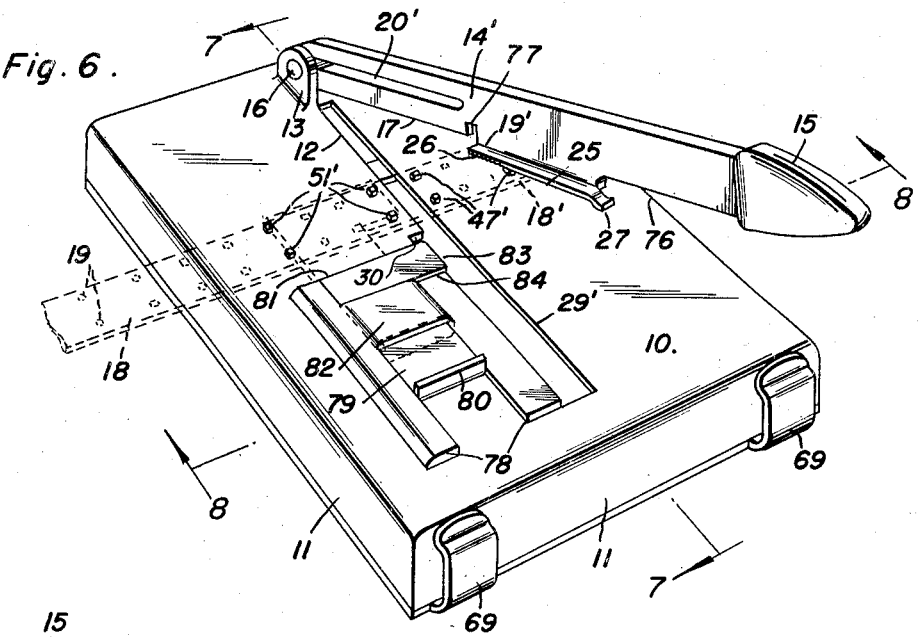
Figure 6 is a perspective view showing a modified form of splicer and viewer.
Figure 7:
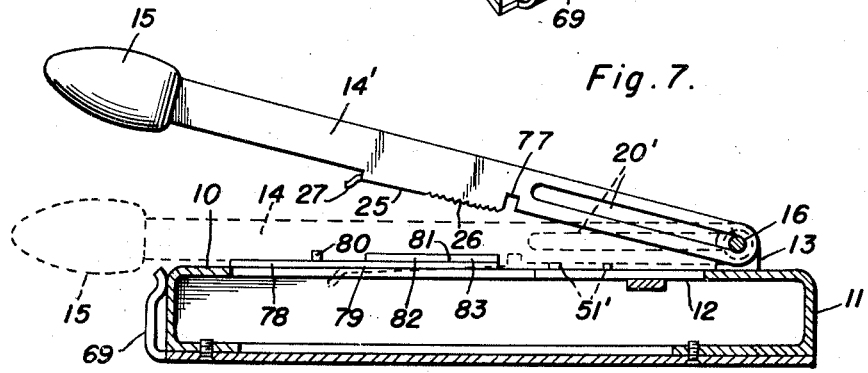
Figure 7 is a sectional view taken on the line 7—7 of Figure 6.
Figure 8:
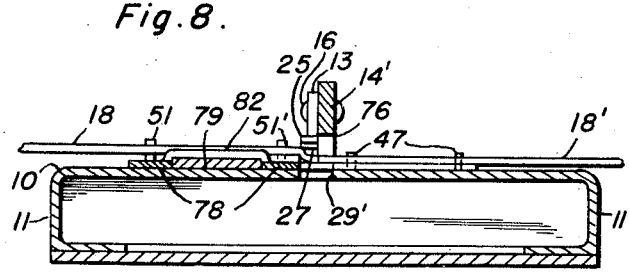
Figure 8 is a sectional view taken on the line 8—8 of Figure 6.
Figure 9:
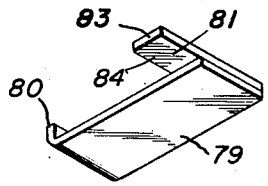
Figure 9 is an inverted perspective view of the film holder employed in Figures 6, 7 and 8; and, Figure 10 is a detail sectional view of a reel on the holder, and crank thereof.

In the form of the invention shown in Figures 6 to 9 inclusive, the construction is practically the same as already described in Figures 1 to 5 inclusive, except that the projections 47' and 51' may be fixed and the slot 42 and holder 44 as shown in Figure 1 are omitted and the opening 29' has the forward reduced extension thereof at the right hand side, of the slot 12 omitted, and the slot 12 from point 30 to the forward end of slot 29 has been enlarged. Also, the blade 14' is provided with a longitudinal slot 20' engaging the pivot 16 and instead of the scraper and holder or clamp 21 for pressing the film sections together at their spliced ends, being slidable in a slot 20 in the blade, the same is fixed or formed as an integral part of the blade as shown in Figure 6 and correspondingly formed with the portions 25, 26, and 27. Preferably, the rear end of the blade is reduced in size as indicated at 76 and a notch 77 is provided in front of the scraper and clamp. Also, the top of the base at the edges of the opening 29' is provided with guides 78 forming a depression or track way therebetween, in which a film holder 79 is slidably mounted to move back and forth. This holder is provided with an upturned lug 80 by which it may be slid or manipulated at its front end and the rear end is provided with a lateral blade extension 81 extending to near the edge of slot 12 or opening 29' to co-operate with the cutting edge of flange 25 on blade 14' in severing the end of the film. It should also be noted that the holder 79 operates beneath a raised connection or retainer 82 across the part between the guides 78 retaining the holder in position at its cutting edge 83. This cutting edge co-operates with the cutting edge of the blade or flange 25 to form a shear for the film section 18' which is placed in position upon the projections or lugs 47', the same as in connection with the projections 47 and 51, except that a sixteen millimeter film is shown with a double row of marginal perforations usually employed in connection with the moving picture or projecting machine to engage in the toothed wheels thereof in feeding the film through the machine in projecting the pictures. Of course, the film may be provided with the usual sound track if desired and as is well known in the art.

In the operation of this device, the blade is adapted to be slid back and forth in the slot 20' in lieu of the slidable scraper 21 described in connection with Figures 1 to 5 inclusive. After viewing the film, the splicer is operated by first placing the film section 18 upon the projections 51' on the base or box. The holder or cutter 79 is then pushed rearwardly over and across the film section 18 at the left. The blade is then grasped and pulled down into the slot and opening 12 and 29' respectively until the cutting edge 17 co-operates with the cutting edge on left hand side of slot 12 constituting shear edges, cut off the end of the film section 18. With the blade still in the hand of the operator, it is pushed back and forth until the scraper passes back and forth over the end of the film 18 to remove the emulsion therefrom. Next, the operator places the cement on the end of the film section 18 and places film section 18' over projections 47' allowing said film section 18' to extend to the left far enough to overlap cutting edge 83 on film holder 79. The blade is then moved downwardly and pushed rearwardly until the cutting edge 25 thereof comes in contact with the cutting edge 83 of the holder 79, the blade being pressed down as far as it will go so as to cut the film, overlap it and press the cemented ends firmly together in one operation. In each instance, the downturned end or catch 27 when moved rearwardly, will engage the rearward end 31 of the opening 29 in Figures 1 to 5 inclusive, and over the edge of the base or box indicated at 30 in Figure 6 of the drawings, holding the splice firmly together until dried. By raising the blade, the catch is released and the blade or holder 19 may be slid forwardly from over the film to remove it in the usual manner.

Thus, I have provided a splicer and viewer which may be economically constructed, and which permits single viewing of film and splicing of the ends of film sections after cutting out bad or imperfect portions thereof, so as to complete a proper film of a picture to be reproduced or projected.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A film splicer and viewer comprising a base, a blade pivoted at the rear of the base, said base having a slot therein and an opening in front of the slot, a holder slidably mounted adjacent the opening at one side of the slot, said base having projections adapted to receive and hold film sections at opposite sides of the opening and slot, said blade having a lateral projection and adapted to be moved back and forth for removing the emulsion from a film and having a roughened portion for removing said emulsion and a clamping portion adapted to hold the spliced ends of the film together when connected.

2. A film splicer and viewer comprising a base having a longitudinal slot, a blade pivoted at the rear end of the slot, a scraper and clamp carried by the blade and having a roughened portion and a catch, said base having an opening therein in front of the slot and in line therewith, projections carried by the base projecting upwardly at opposite sides of the slot to engage the perforations in film sections and adapted when severed to cause said film sections to overlap and be cemented together and pressed together by the clamp of the blade, said clamp being adapted to move back and forth to remove the emulsion from the top of one section of the film and the holder and the base slidable to engage over the film section when disposed in overlapping relation for splicing.

3. In a film splicer, a base, a reel holding means at the front of the base, a blade pivoted at the rear end of the base and having thereon a scraper and clamp provided with a catch, said scraper adapted to be moved back and forth, said base having a slot therein running longitudinally and a wider opening in front of the slot, having an edge engaged by the catch, a holder slidable on the base adjacent the opening, said base having projections extending upwardly for engagement with the ends of film sections whereby the blade may be used to cut off the ends thereof, so that when one film section is moved inwardly to overlap the other, the scraper may be used to remove the emulsion from one end of a film section and to press the cemented ends of the film section together to join the same in a splice, and means for moving said holder back and forth.

4. In a film splicer, a base, a reel holding means at the front of the base, a blade pivoted at the rear end of the base and having thereon a scraper and clamp provided with a catch, said scraper adapted to be moved back and forth, said base having a slot therein running longitudinally and a wider opening in front of the slot, having an end to engage the catch, a holder slidable on the base adjacent the opening, said base having projections extending upwardly for engagement with the ends of the film sections whereby the blade may be used to cut off the ends thereof, whereby when one film section is moved inwardly to overlap the other, the scraper may be used to remove the emulsion from one end of a film section and to press the cemented ends of the film section together to join the same in a splice, certain projections being mounted on a spring beneath the base and adapted to be displaced upwardly and downwardly and the other projections being adapted to be shifted inwardly, and means on the holder adapted to engage a projection of the latter projections, said holder being designed to engage over the film sections to hold them in position and means for operating the holder.

HARRY B. CORSAW.

REFERENCES CITED

The following references are of record in the file of this patent:

UNITED STATES PATENTS

| Number | Name | Date |
|--------|------|------|
| 1,044,258 | Schafer | Nov. 12, 1912 |
| 1,175,449 | Hirsch | Mar. 14, 1916 |
| 1,489,261 | Malizia | Apr. 8, 1924 |
| 1,809,339 | Hayden | June 9, 1931 |
| 1,916,311 | Hayden | July 4, 1933 |
| 2,126,298 | Wittel | Aug. 9, 1938 |
| 2,231,383 | Goldberg | Feb. 11, 1941 |